March 28, 1944.   W. W. NARAMORE   2,345,416
VIEWER FOR TRANSPARENCIES
Filed June 18, 1941
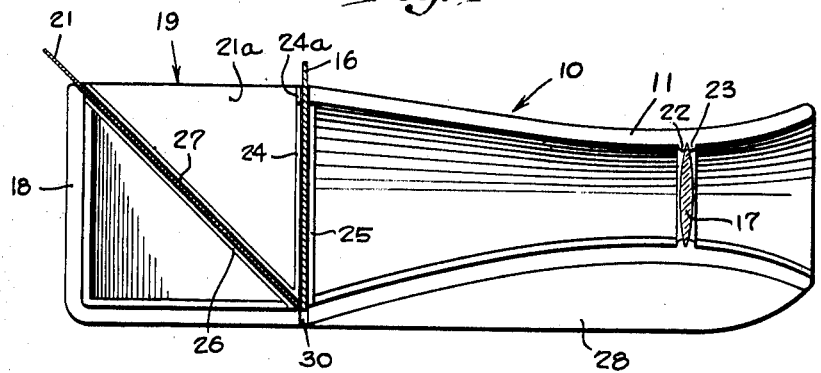
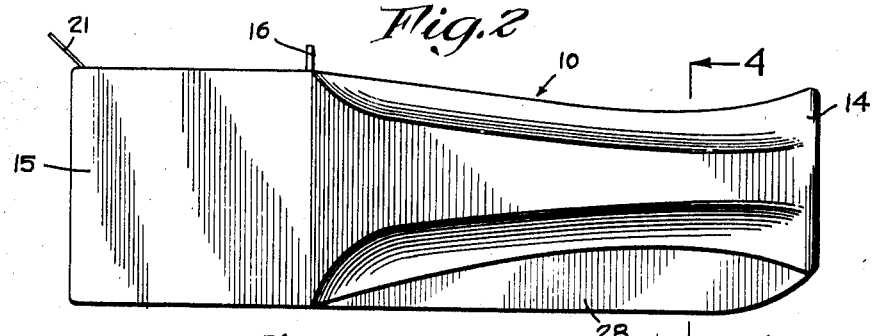
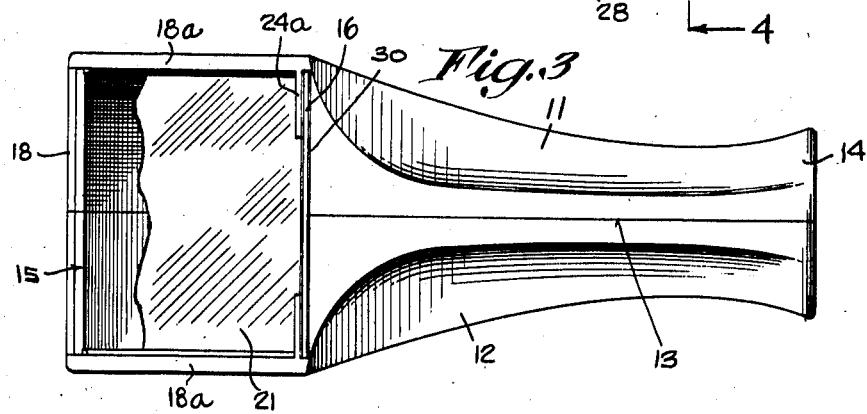
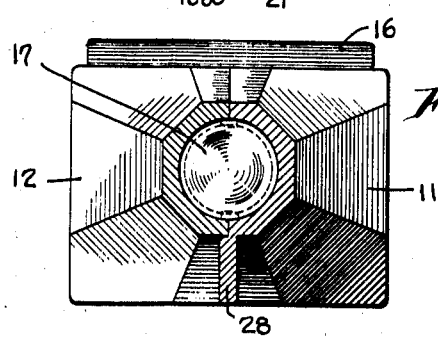
INVENTOR
William W. Naramore
BY
Johnson, Klein and Smyth
ATTORNEYS Patented Mar. 28, 1944

2,345,416

UNITED STATES PATENT OFFICE 2,345,416

VIEWER FOR TRANSPARENCIES

William W. Naramore, Bridgeport, Conn.

Application June 18, 1941, Serial No. 398,512

4 Claims. (Cl. 88—39)

The present invention relates to a viewing device for transparencies.

With the present trend of photography involving the taking of pictures on continuous strips of film by "candid" cameras or the like and the taking of colored films, the viewing of these films or transparencies has become very popular.

Heretofore, the person viewing the transparency has been required to hold it up to a light source so that the rays from the source pass through the transparency and illuminate it. Some light would strike the face of the transparency and the glare would tend to reduce the effective illumination thereof. At other times, it has been attempted to view transparencies by means of an elongate light-tight viewer having a slot at one end for receiving the transparency and an eyepiece at the other so as to eliminate the glare. The viewer was held in a position so that light from a source passed directly through the transparency toward the eyepiece. However, in both instances, such illumination was not satisfactory inasmuch as the reflecting properties of the elements located around the light source produced an uneven illumination, and even the filaments of the light source itself, were visible and affected the illumination of the transparency. Further, the light sources were usually close to the ceiling and the person using the device was forced to assume uncomfortable positions in order to have the best illumination of the transparency.

These difficulties have been avoided by the present invention wherein the viewer, which excludes all light from the face of the transparency, is provided with an illuminating means having a light reflector in the back thereof which directs light through the transparency from a source of light disposed at the side of the viewer and distributes the light evenly and uniformly over the transparency being viewed. The reflector makes it possible to secure uniform illumination with the viewer held at eye level and without requiring the user to hold it in an uncomfortable position, thus adding to the pleasure of viewing the transparencies.

The user of the device receives only the evenly distributed light from the reflecting means behind the transparency which passes through it and is undiminished by any light-reflected glare from the face of the transparency. The transparency thus illuminated will appear to have unusual depth and clearness, and if a colored transparency is being viewed, the colors will appear exceptionally brilliant.

Another feature of the invention is the construction of the component parts of the viewer so that they can be readily and cheaply manufactured, and which at the same time maintains an accurate relation between the elements of the viewer to produce a clear and better illuminated transparency.

Other features and advantages of the invention will be apparent from the specification and claims when considered in connection with the drawing, in which:

Figure 1 shows an elevational view of one-half of the casing with the lens, transparency and reflector in section.

Figure 2 is a side elevational view of the device.

Figure 3 is a top plan view of the device.

Figure 4 is a sectional view taken along line 4—4 of Figure 2.

As shown in the drawing, the viewing device of the present invention comprises an elongate hollow casing 10 formed of a plurality of sections 11 and 12, joined together along a medial line 13 to provide a light-tight casing.

The casing 10 is arranged with an eyepiece 14 at one end and reflecting chamber 15 at the other end and is provided with means adjacent the reflecting chamber for receiving and supporting a transparency 16. Preferably, a lens 17 is mounted in the casing adjacent the eyepiece to magnify the picture on the transparency.

The portion of the casing between the means for mounting the transparency and the eyepiece being light-tight no light can enter and be reflected from the front surface of the transparency to produce the objectionable glare which tends to reduce the effective illumination of the transparency.

This section can have any suitable outer configuration. As shown in Fig. 4, the preferred shape of this casing is octagonal and merges into the reflecting chamber. The interior surface of this portion of the casing, however, is preferably shaped to provide a smooth substantially frusto-conical surface, as will be seen in Figure 1.

While the reflecting chamber may be of any suitable shape, in the preferred form of the invention it is substantially rectangular and is provided with a wall 18 closing the end of the elongate casing and with an opening 19 to the side through which light may pass. The rear wall 18 prevents any light from passing directly from a light source through the transparency to the eyepiece which would produce an unsatisfactory illumination of the transparency.

The reflecting chamber has mounted therein a reflecting member 21 which is positioned opposite the open side. While this reflector may be of a parabolic section, in the preferred form a flat member is employed and disposed in the chamber at an angle of substantially 45° with respect to said open side and the rear side of the transparency. Any light which enters the reflecting chamber through the opening 19 will be reflected from the member 21 through the transparency. If the opening 19 is at the top side of the casing, as shown in the preferred form of the invention, the usual overhead lights can be utilized to illuminate the transparency without requiring the user to assume uncomfortable positions.

While many reflecting mediums may be used, in the preferred form of the invention a heavyweight white bristol board, paper or the like material is used. The surface of this material not only reflects the light from the light source, but also diffuses it so that a uniform illumination of the transparency is obtained. Even if a lamp is used as the light source, the reflector of the present invention will prevent the image of the lamp or filaments thereof from being reflected through the transparency and impairing the view thereof. To further insure a more complete and uniform illumination of the transparency, the side walls 18a of the reflecting chamber can be covered with reflecting material 21a.

While the device may be made up in many ways, as by being formed of sheet metal or heavy cardboard, in the preferred form of the invention the two sections of the casing are cast or molded from moldable material, such as suitable plastics or lightweight metal, assembled, and secured together to form a rigid unit.

In molding the sections, the inner surfaces thereof are provided with a pair of ribs 22, 23, adjacent the eyepiece. These ribs may be formed of the material of the casing or of elements inserted during molding and form a groove to receive and rigidly hold the lens 17 when the two sections of the casing are secured together.

Each of the sections of the casing are also provided with ribs 24, 25 on the walls thereof which, when the sections are assembled, form a slot or groove for slidably receiving the transparency 16 and holding it in predetermined position with respect to the lens. It will be noted in Figure 1 that the center of the lens is in alignment with the center of the transparency.

The side walls of the reflecting chambers are also provided with a pair of spaced integral ribs 26, 27 extending diagonally across the side walls of the chamber and form a groove for the reception of the reflecting member which is removably supported thereby and can be replaced or renewed if the surface becomes dull or damaged.

With the ribs formed rigidly with the casing at the time the sections are molded, a rugged yet simple construction is produced which can be economically manufactured. The elements of the viewer will be always retained in a predetermined fixed relation with one another, thus eliminating any need for troublesome adjustments.

In order to aid in handling the viewer, the casing may be provided with a finger grip 28 which may be made integral with one of the sections as shown in Figures 1 and 4. The viewer can be readily held by this finger grip with one hand while the transparencies are manipulated by the other hand. The rib also cooperates with the base of the reflecting chamber to form a support for the viewer.

While the device as illustrated shows a slide-type transparency disposed in the viewer, it is to be understood that the viewer can also be used with transparencies in the form of continuous film. To receive the film, the bottom of the viewer is provided with a slot 30 of such width as to accommodate 35 mm. film. The upper portions of ribs 24 extend as at 24a, as shown in Figs. 1 and 3, so as to overlie the edges of the film and hold it in extended position across the viewer. The natural curl in the film causes it to press against the portions 24a and aids in holding it against accidental movement during the viewing thereof.

When 35 mm. is used, a suitable mask may be inserted in the slot to block out any light passing around the edges of the film which is, of course, narrower than the width of the reflecting chamber.

The film can readily be drawn through the device to expose frame after frame and the illumination of each frame on the 35 mm. film will be the same as when the slide-type transparency was used.

Variations and modifications may be made within the scope of this invention and portions of the improvements may be used without others.

I claim:

1. A device for viewing transparencies comprising an elongate tubular hollow casing formed of a plurality of sections, each of said sections having a lens-receiving groove, a transparency-receiving groove and a reflector-receiving groove formed integrally on the inner surface thereof in predetermined fixed relation, a lens disposed in the lens-receiving groove and securely held in position by the assembled sections, and a reflector of white paper-like material removably mounted in the reflector-receiving groove and adapted to reflect and diffuse light from a light source through a transparency positioned in the transparency-receiving groove to the lens.

2. A device for viewing transparencies comprising an elongate hollow casing having an eyepiece at one end and a light-reflecting chamber at the other end opening to one side of the casing and provided with a wall closing the end of the casing, a lens fixedly mounted within the casing adjacent the eyepiece, and means including grooves on the interior of the casing adjacent the light-reflecting chamber for slidably mounting a transparency to extend across the casing with the center of the transparency aligned with the center of the lens, said casing between the lens and transparency being light-tight and having a smooth substantially frusto-conical inner surface, said light-reflecting chamber reflecting light from a laterally disposed light source through the transparency to indirectly illuminate the same.

3. A device for viewing transparencies including a molded casing comprising two complementary members fitted together along a longitudinal axis to form an elongate tubular hollow light-tight section having a light-reflecting chamber at one end; light-reflecting light-diffusing means in said chamber; a lens at the other end of said section, the inner walls of said members having grooves molded therein to receive and hold the lens, to removably receive and support a single transparency adjacent the light-receiving chamber, and grooves in the light-receiving chamber for receiving the light-reflecting member when the two complementary members are assembled.

4. A device for viewing transparencies comprising an elongate tubular hollow light-tight casing having an eyepiece at one end and a light-reflecting chamber at the other end; means on the casing adjacent the light-reflecting chamber for slidably receiving and mounting a single transparency to extend across the casing, said light-reflecting chamber having an opening in one side of the casing perpendicular to said transparency and having a wall closing the end of the casing; means within the light-reflecting chamber for locating and detachably supporting a light-reflecting light-diffusing member therein with the reflecting surface at an angle to the opening; and a light-reflecting, light-diffusing member having a white light engaging surface mounted in the supporting means for reflecting light passing through the opening from a laterally disposed light source evenly through the transparency to indirectly illuminate the same and provide the sole illuminating means for the transparency, the light-reflecting light-diffusing member being readily accessible and engageable from the outside of the casing for removal and replacement of said member.

WILLIAM W. NARAMORE.